(12) United States Patent
Schultz et al.

(10) Patent No.: US 8,848,897 B2
(45) Date of Patent: Sep. 30, 2014

(54) AUTOMATED MULTIMEDIA CALL CENTER AGENT

(75) Inventors: Paul T. Schultz, Colorado Springs, CO (US); Robert A. Sartini, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1267 days.

(21) Appl. No.: 11/961,397

(22) Filed: Dec. 20, 2007

(65) Prior Publication Data

US 2009/0161838 A1      Jun. 25, 2009

(51) Int. Cl.
*H04M 3/00*     (2006.01)
*G06F 17/30*    (2006.01)
*H04L 29/06*    (2006.01)
*H04M 3/51*     (2006.01)

(52) U.S. Cl.
CPC ............ *H04M 3/5166* (2013.01); *H04L 65/40* (2013.01); *H04M 2201/40* (2013.01); *H04M 3/5191* (2013.01)
USPC ..................................... 379/265.09; 707/708

(58) Field of Classification Search
USPC .............. 379/265.09, 88.01, 265.02; 707/708
See application file for complete search history.

(56) References Cited

U.S. PATENT DOCUMENTS

| | | | |
|---|---|---|---|
| 7,298,831 B1 * | 11/2007 | Keohane et al. | 379/88.23 |
| 8,086,758 B1 * | 12/2011 | Allan et al. | 709/253 |
| 2004/0107136 A1 * | 6/2004 | Nemirofsky et al. | 705/14 |
| 2005/0055344 A1 * | 3/2005 | Liu | 703/3 |
| 2008/0243501 A1 * | 10/2008 | Hafsteinsson et al. | 704/235 |
| 2012/0005200 A1 * | 1/2012 | Lawrence | 707/723 |

* cited by examiner

*Primary Examiner* — Rasha Al Aubaidi

(57) ABSTRACT

An automated multimedia call center device may receive a verbal request for information from a user device during a multimedia session between the automated multimedia call center device and the user device. The automated multimedia call center device may further obtain a group of recognition results for the verbal request using speech recognition, cause at least two recognition results of the group of recognition results to be visually displayed on the user device, receive selection of one recognition result of the at least two recognition results, perform a search using the selected one recognition result to obtain multimedia content, and provide the multimedia content to the user device.

23 Claims, 17 Drawing Sheets

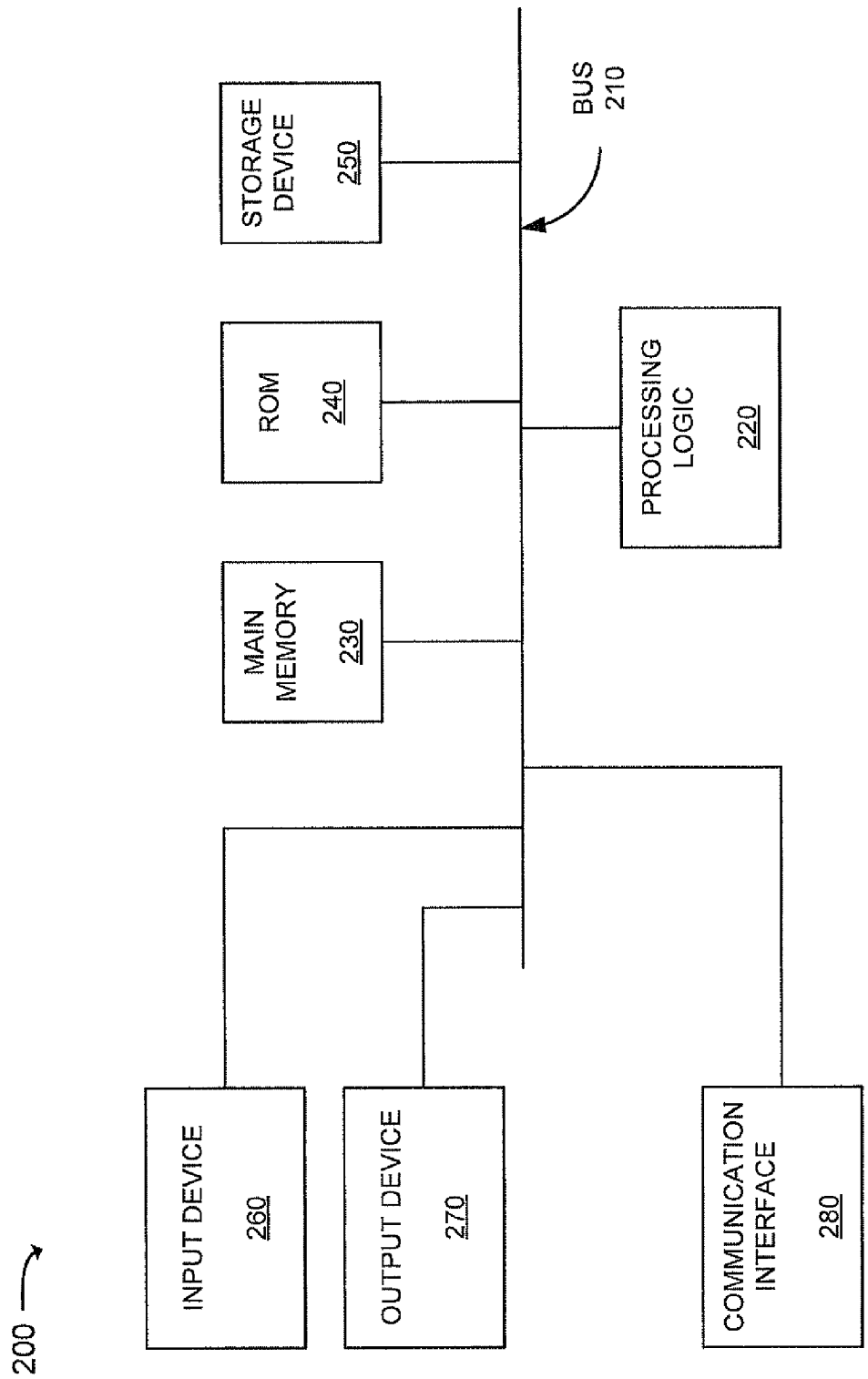

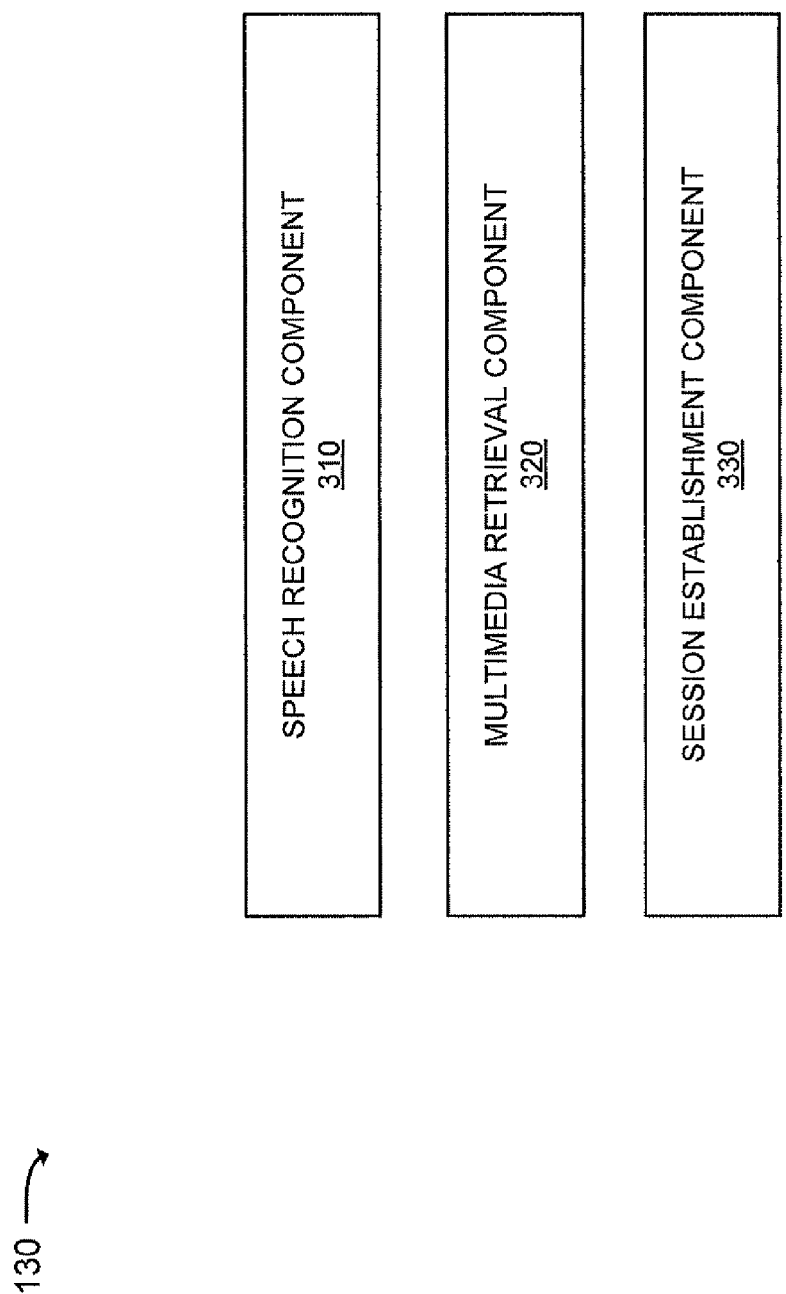

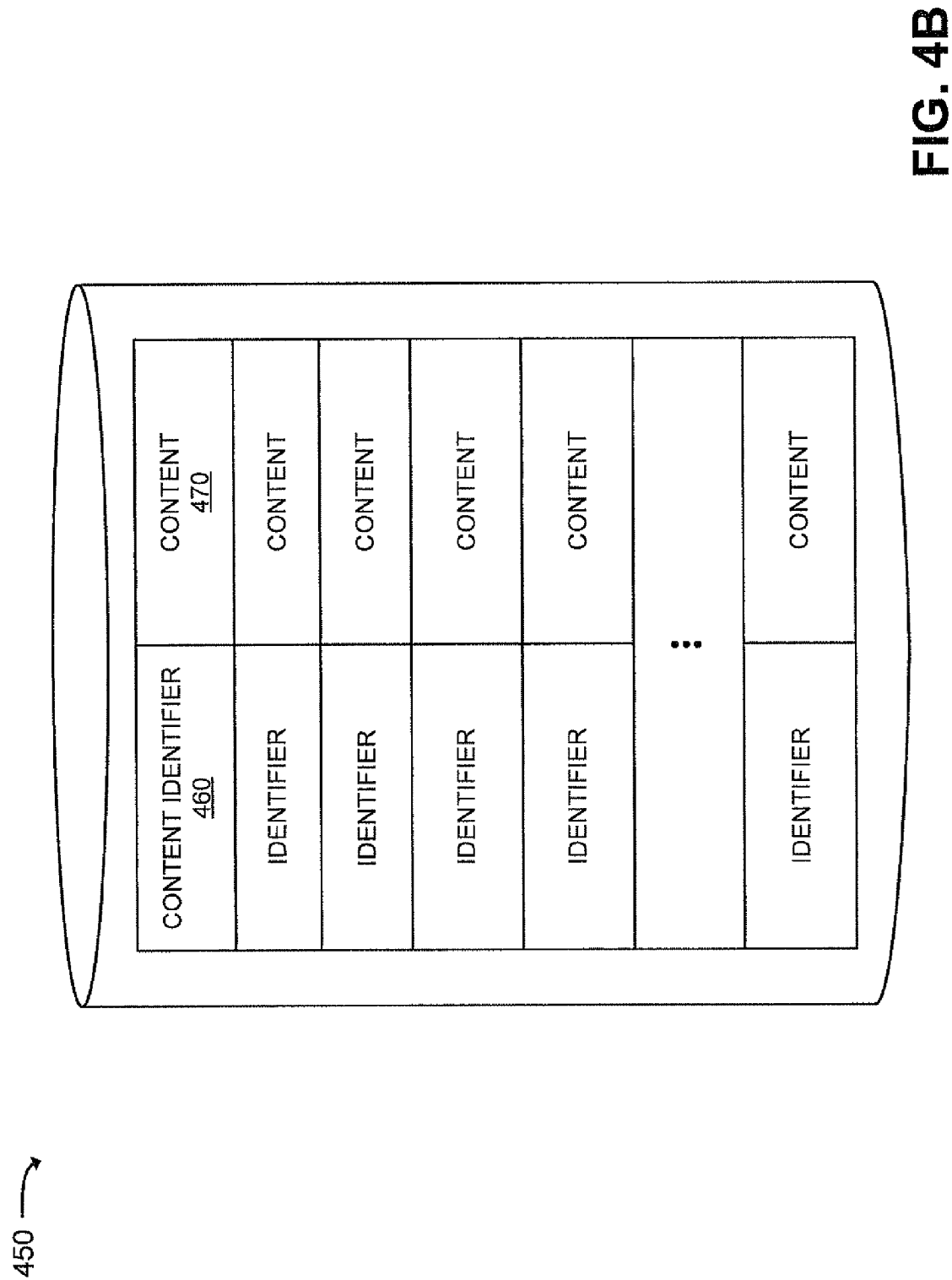

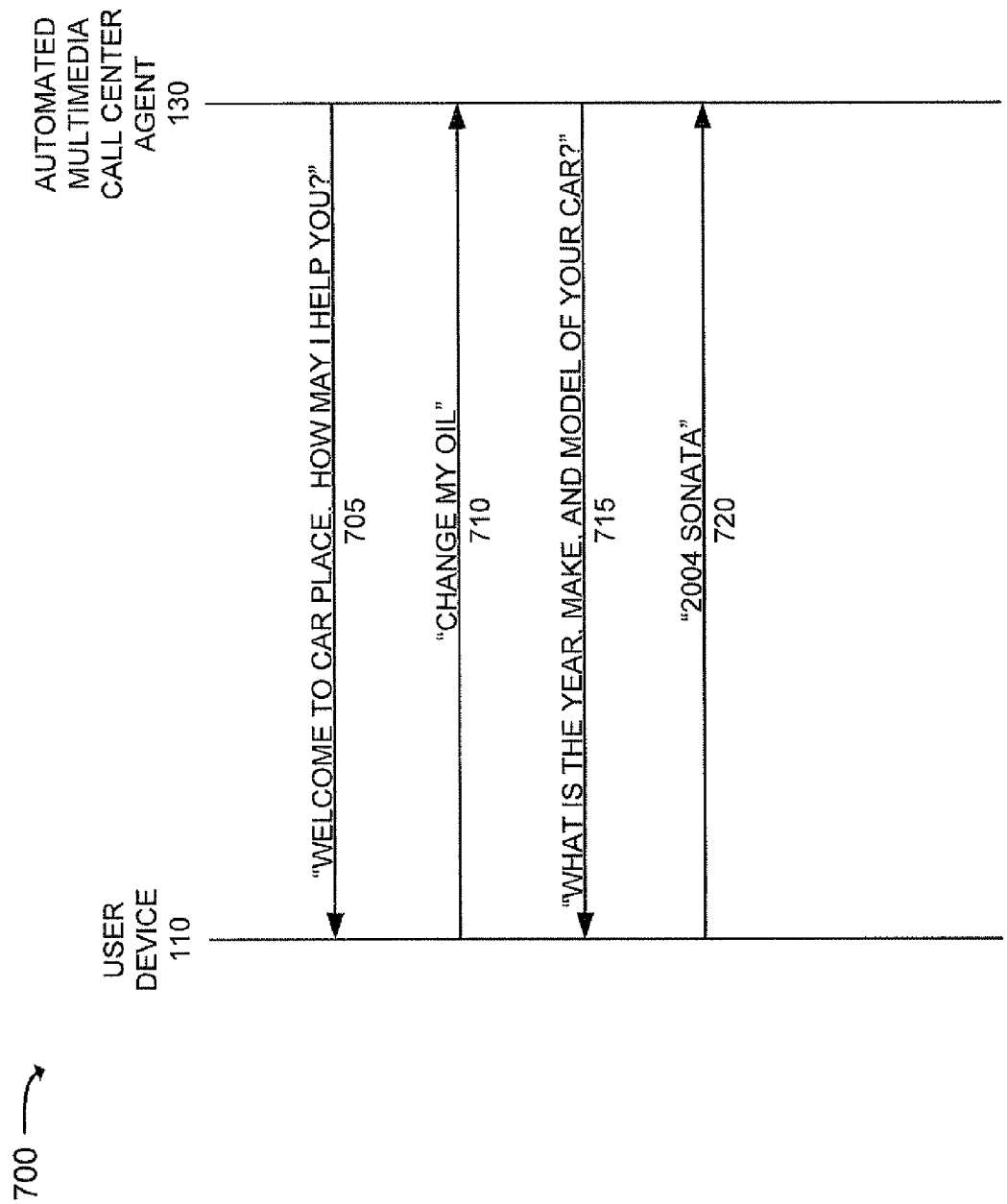

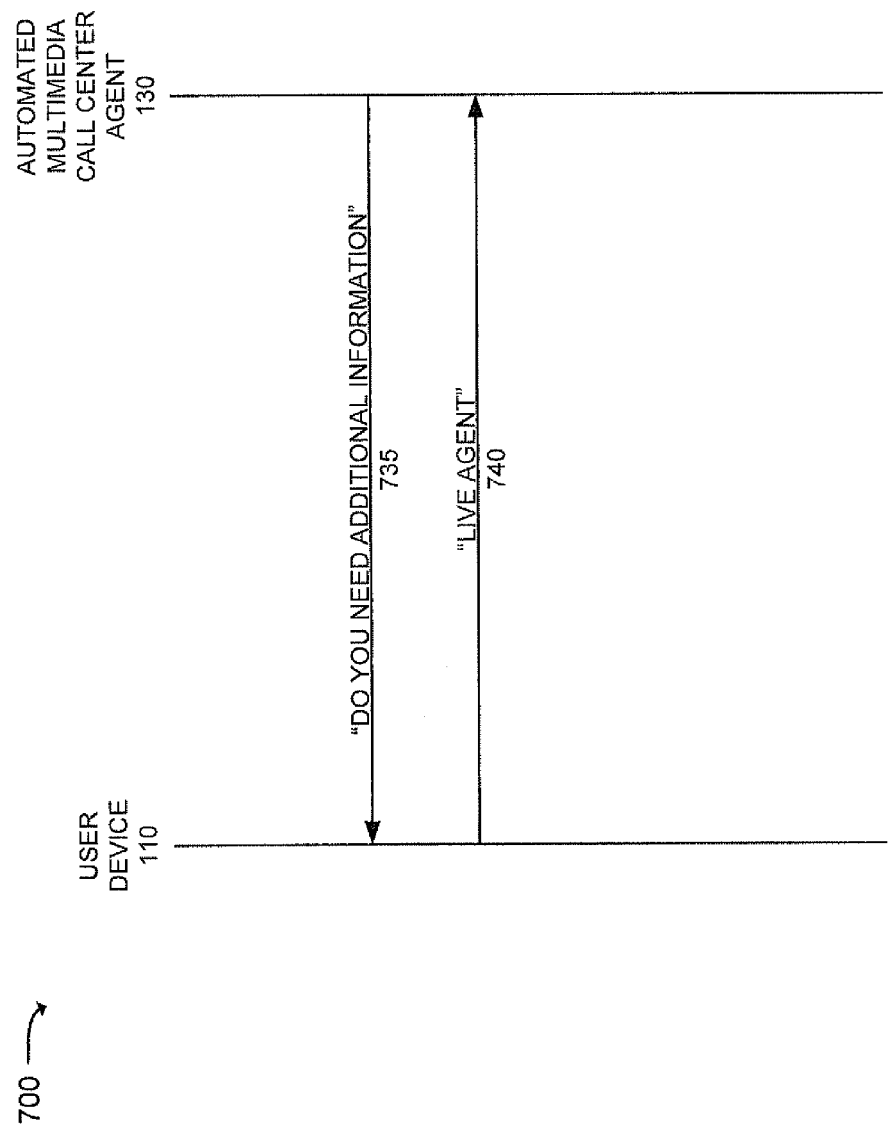

AUTOMATED MULTIMEDIA CALL CENTER AGENT

BACKGROUND INFORMATION

Call center agents handle a variety of requests from customers. For example, a call center agent may receive a voice call from a customer who has questions about how to set up a broadband home router. The call center agent or an automated speech recognition system attempts to guide the customer to problem resolution during the voice call.

BRIEF DESCRIPTION OF THE DRAWINGS

FIG. 2 is an exemplary block diagram of a device consistent with exemplary embodiments;

FIG. 3 is an exemplary functional diagram of a portion of the automated multimedia call center agent of FIG. 1;

FIGS. 4A-4B are exemplary diagrams of portions of databases that may be associated with the automated multimedia call center agent of FIG. 1;

FIGS. 7A-7F illustrate an example of the exemplary process of FIGS. 5 and 6;

DETAILED DESCRIPTION OF PREFERRED EMBODIMENTS

The following detailed description of exemplary embodiments refers to the accompanying drawings. The same reference numbers in different drawings may identify the same or similar elements. Also, the following detailed description does not limit the invention.

Embodiments described herein are directed to an automated multimedia call center agent that uses rich multimedia content and speech recognition to resolve customer problems. For example, a customer may initiate a video session to the automated multimedia call center agent to resolve a home wireless router issue. The automated multimedia call center agent may interact with the customer, using speech recognition, to identify the problem to be solved. Following problem identification, the automated multimedia call center agent may provide rich multimedia content, including, for example, documentation relating to the router issue, frequently asked questions relating to the router issue, and video relating to the router issue (e.g., visually showing where to plug cables and how to input configuration information).

In the event that the multimedia content does not resolve the router issue, the automated multimedia call center agent may transfer the video session to a live call center agent. The video session between the customer and the live call center agent can now include multimedia communications, where, for example, the customer could display to the live call center agent, using multimedia technology, equipment cable connections on their router and their router's configuration tables.

An "automated multimedia call center agent," as broadly described herein may include one or more components located on a live call center agent's device (or a user's device) and/or one or more components located on one or more network devices, such as a server. Thus, an "automated multimedia call center agent" may include components located on a single device or on multiple (possibly remote) devices. For explanatory purposes, the automated multimedia call center agent will be described as being located on a network device, such as a server. Moreover, while the following description focuses on an automated call center agent, embodiments described herein are not so limited. For example, an automated multimedia call center agent may provide piano instructions, math instructions, cooking instructions, tour guide information, and/or other types of information in a multimedia format.

Figure 1:
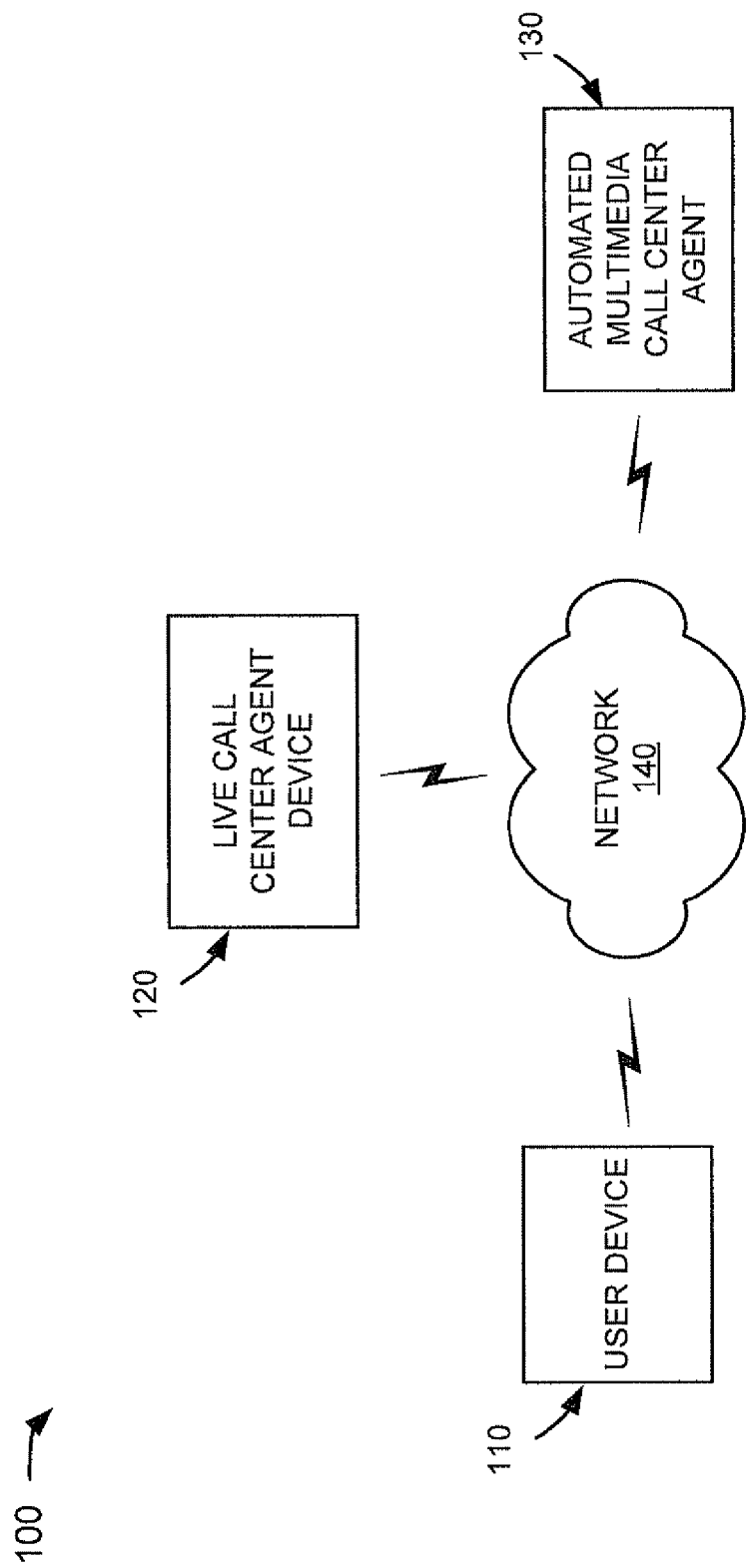
FIG. 1 is an exemplary network in which systems and methods, consistent with exemplary embodiments, may be implemented.

FIG. 1 is an exemplary network 100 in which systems and methods, consistent with exemplary embodiments, may be implemented. As illustrated, network 100 may include a user device 110, a live call center agent device 120, an automated multimedia call center agent 130, and a network 140. The number of user devices 110, live call center agent devices 120, automated multimedia call center agents 130, and networks 140 illustrated in FIG. 1 is provided for simplicity. In practice, there may be more user devices 110, live call center agent devices 120, automated multimedia call center agents 130, and/or networks 140.

User device 110 may include a client entity capable of receiving and/or providing multimedia content. An entity may be defined as a device, such as a computer or another type of computation or communication device, a thread or process running on one of these devices, and/or an object executable by one of these devices. In one embodiment, user device 110 may include a personal computer, a laptop, a wireless device (e.g., a cellular telephone, a personal digital assistant (PDA), etc.), a telephone device (such as a Plain Old Telephone System (POTS) telephone, a Session Initiation Protocol (SIP) telephone, etc.), a set-top box that provides network access, an Internet Protocol (IP) Multimedia Subsystem (IMS) client, and/or any other type of device that may interact with another device, such as automated multimedia call center agent 130. User device 110 may connect to network 140 via wired and/or wireless connections.

Live call center agent device 120 may include a client entity capable of interacting with user device 110. The interaction may include providing and/or receiving multimedia content. As indicated above, an entity may be defined as a device, such as a computer or another type of computation or communication device, a thread or process running on one of these devices, and/or an object executable by one of these devices. In one embodiment, live call center agent device 120 may include a personal computer, a laptop, a wireless device (e.g., a cellular telephone, a PDA, etc.), a telephone device (such as a POTS telephone, a SIP telephone, etc.), a set-top box that provides network access, an IMS client, and/or any other type of device that may interact with another device, such as user device 110. Live call center agent device 120 may connect to network 140 via wired and/or wireless connections.

Automated multimedia call center agent 130 may include a server entity. As indicated above, an entity may be defined as a device, such as a computer or another type of computation or communication device, a thread or process running on one of these devices, and/or an object executable by one of these devices. In one embodiment, automated call center agent 130 may provide multimedia content in response to input from a user associated with user device 110. Automated call center agent 130 may also receive and store multimedia content for later access by a user device 110. Automated multimedia call center agent 130 may connect to network 140 via wired and/or wireless connections.

Network 140 may include one or more networks of any type, including a Public Land Mobile Network (PLMN), a telephone network (e.g., a Public Switched Telephone Network (PSTN) and/or a wireless network), a local area network (LAN), a metropolitan area network (MAN), a wide area network (WAN), an IMS network, a private network, the Internet, an intranet, and/or another type of network or combination of networks.

In some embodiments, one or more components of network 100 may perform one or more of the tasks described as being performed by one or more other components of network 100.

FIG. 2 is an exemplary block diagram of a device 200 in one embodiment. Device 200 may correspond to user device 110, live call center agent device 120, and/or automated multimedia call center agent 130. As illustrated, device 200 may include a bus 210, processing logic 220, a main memory 230, a read only memory (ROM) 240, a storage device 250, an input device 260, an output device 270, and/or a communication interface 280. In one embodiment, device 200 may include fewer, additional, or different components than those illustrated in FIG. 2.

Bus 210 may include a path that permits communication among the components of device 200. Processing logic 220 may include a processor, a microprocessor, or other types of processing logic, such as an application specific integrated circuit (ASIC), a field programmable gate array (FPGA), etc., that may interpret and execute instructions. Main memory 230 may include a random access memory (RAM) or another type of dynamic storage device that may store information and instructions for execution by processing logic 220. ROM 240 may include a ROM device or another type of static storage device that may store static information and instructions for use by processing logic 220. Storage device 250 may include a magnetic and/or optical recording medium and its corresponding drive.

Input device 260 may include a mechanism that permits an operator to input information to device 200, such as a keyboard, a mouse, a pen, a microphone, a camera, an audio/video recorder, etc. Output device 270 may include a mechanism that outputs information to the operator, including a display, a printer, a speaker, etc. Communication interface 280 may include any transceiver-like mechanism that enables device 200 to communicate with other devices and/or systems via a network, such as network 140.

As will be described in detail below, device 200 may perform certain operations. Device 200 may perform these and other operations in response to processing logic 220 executing software instructions contained in a computer-readable medium, such as main memory 230. A computer-readable medium may be defined as a physical and/or logical memory device or a carrier wave.

The software instructions may be read into main memory 230 from another computer-readable medium, such as storage device 250, or from another device via communication interface 280. The software instructions contained in main memory 230 may cause processing logic 220 to perform processes that will be described later. Alternatively, hardwired circuitry may be used in place of, or in combination with, software instructions to implement processes consistent with exemplary embodiments. Thus, embodiments described herein are not limited to any specific combination of hardware circuitry and software.

FIG. 3 is an exemplary functional diagram of a portion of automated multimedia call center agent 130 according to an exemplary embodiment. As illustrated, automated multimedia call center agent 130 may include a speech recognition component 310, a multimedia retrieval component 320, and a session establishment component 330. In other embodiments, automated multimedia call center agent 130 may include fewer, additional, or different components than illustrated in FIG. 3. Moreover, one or more of the components illustrated in FIG. 3 may additionally and/or alternatively be implemented within another device, such as live call center agent device 120.

Speech recognition component 310 may include one or more components that perform recognition services for speech received from a user device, such as user device 110. In one embodiment, speech recognition component 310 may receive a speech signal (e.g., from a user of user device 110) and use a speech recognition technique to convert the speech signal to a set of words, as a recognition result. The recognition result may be used by automated multimedia call center agent 130 to, for example, identify a request submitted by the user. In one embodiment, speech recognition component 310 may provide one or more graphical user interfaces to user device 110 to help identify a word or words received from user device 110.

Multimedia retrieval component 320 may include one or more components that receive a recognition result from speech recognition component 310, obtain multimedia content relating to the recognition result, and provide the multimedia content. In one embodiment, multimedia retrieval component 320 may include an Interactive Voice Response (IVR) system that allows automated multimedia call center agent 130 to interact (visually and/or audibly) with the user associated with user device 110 to receive additional information relating to the initial request. Multimedia retrieval component 320 may use the recognition result as part of a search query and perform a search using the search query to obtain the multimedia content. In some embodiments, multimedia retrieval component 320 may further include one or more components that allow a user to provide multimedia content to automated multimedia call center agent 130 for later retrieval by the user or another user.

Session establishment component 330 may include one or more components capable of transferring a session between automated multimedia call center agent 130 and a user device, such as user device 110, to another device, such as live call center agent device 120. In one embodiment, session establishment component 330 may transfer a session in response to a request from the user of user device 110. Additionally or alternatively, session establishment component 330 may automatically transfer a session to live call center agent device 120 (e.g., in a situation where automated multimedia call center agent 130 cannot identify multimedia content for a user). In some embodiments, session establishment component 330 may modify multimedia content based on the capabilities of a user device 110. For example, session establishment component 330 may convert particular content from a first format to a second format (e.g., a data file to an audio file, etc.) based on the capabilities of a user device 110. Additionally or alternatively, session establishment component 330 may translate all or a portion of the multimedia content provided to a user device 110 from a first language to a second language based on a language preference of the user of user device 110.

In some embodiments, one or more components of the above portion of automated multimedia call center agent 130 may perform one or more of the tasks described as being performed by one or more other components of the above portion of automated multimedia call center agent 130.

Figure 4A:
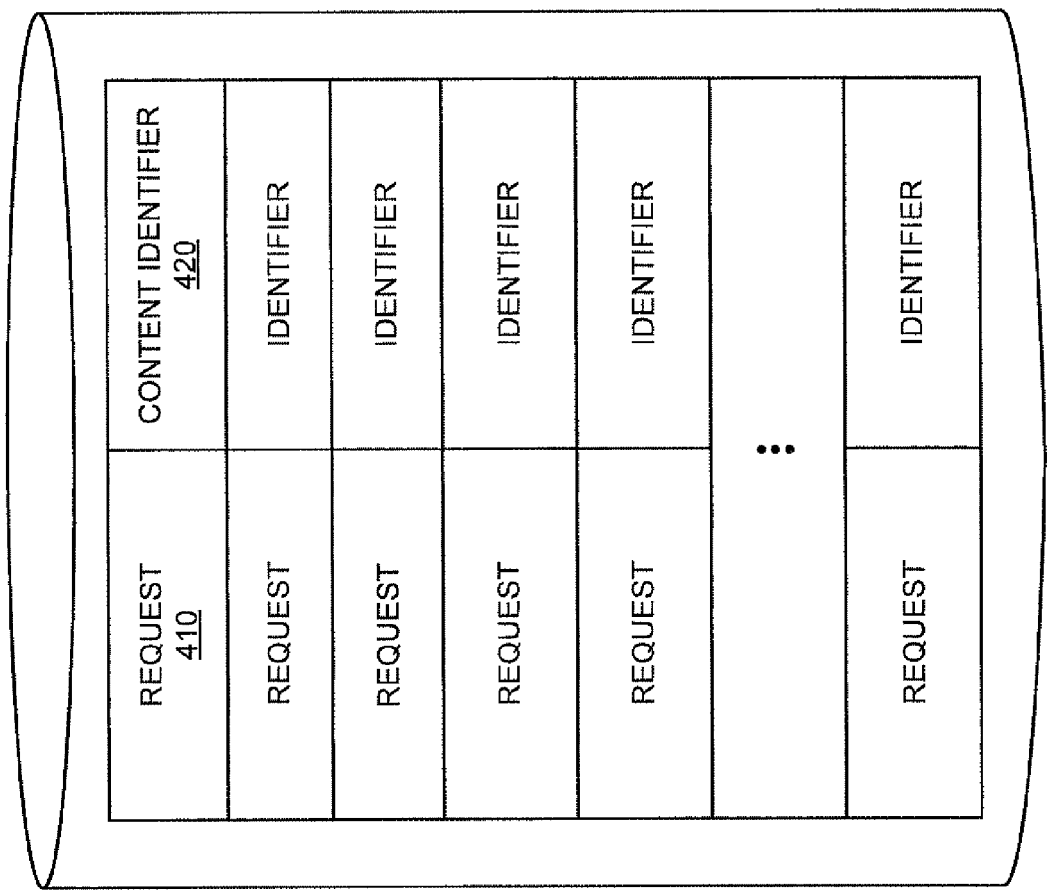

FIG. 4A is an exemplary diagram of a portion of a first database 400 that may be associated with automated multimedia call center agent 130. In addition or alternatively, database 400 may be associated with another device, such as live call center agent device 120. While one database is described below, it will be appreciated that database 400 may include multiple databases stored locally at automated multimedia call center agent 130 (and/or live call center agent device 120), or stored at one or more different and possibly remote locations.

As illustrated, database 400 may maintain a group of entries in the following exemplary fields: a request field 410 and a content identifier field 420. Database 400 may maintain additional or different information than that illustrated in FIG. 4A.

Request field 410 may store information identifying a request that may be provided to automated multimedia call center agent 130. For example, the request may involve a computer issue, a networking issue, an automotive issue, a cooking question, and/or any other type of request that may be provided to a call center agent.

Content identifier field 420 may store a sequence of characters that identifies multimedia content that may be provided when the request identified in request field 410 is received from a user. The sequence of characters may be a unique sequence of characters.

FIG. 4B is an exemplary diagram of a portion of a second database 450 that may be associated with automated multimedia call center agent 130. In addition or alternatively, database 450 may be associated with another device, such as live call center agent device 120. While one database is described below, it will be appreciated that database 450 may include multiple databases stored locally at automated multimedia call center agent 130 (and/or live call center agent device 120), or stored at one or more different and possibly remote locations.

As illustrated, database 450 may maintain a group of entries in the following exemplary fields: a content identifier field 460 and a content field 470. Database 450 may maintain additional or different information than that illustrated in FIG. 4B.

Content identifier field 460 may store a sequence of characters that identifies multimedia content. The sequence of characters may be automatically generated or supplied by a user, such as a user associated with a user device 110.

Content field 470 may store multimedia content or one or more links to multimedia content that is associated with the identifier in content identifier field 460. The multimedia content may include, for example, one or more image files, audio files, video files, text files, etc. In one embodiment, content field 470 may additionally store content information indicating how the multimedia content is to be provided to a user (e.g., the sequence in which the content is to be provided, how the content is to be combined, etc.).

Figure 5:
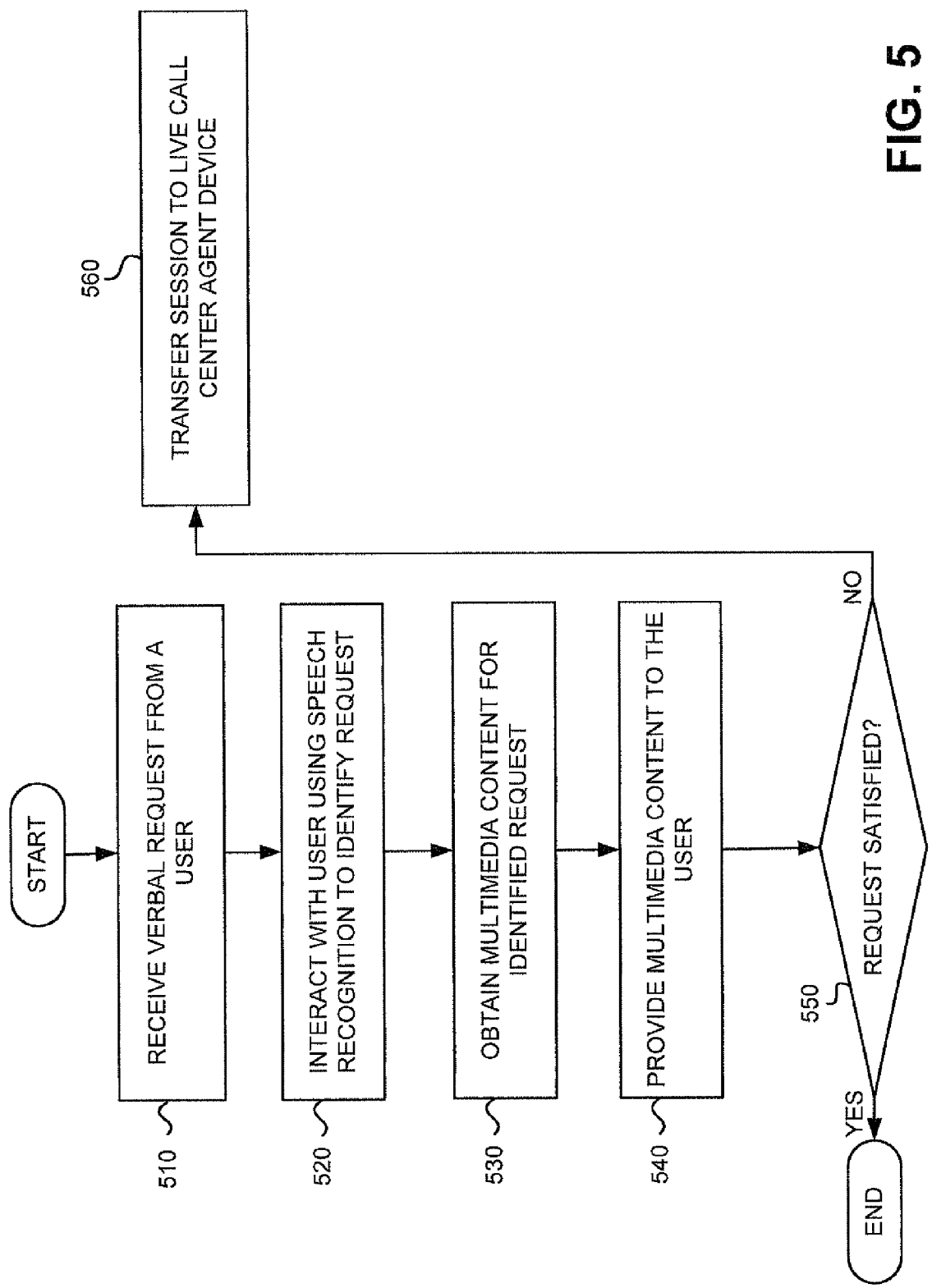
FIGS. 5 and 6 are a flow chart of an exemplary process for providing multimedia content in exemplary embodiments.

FIG. 5 is a flow chart of an exemplary process for providing multimedia content according to an exemplary embodiment. In one embodiment, the exemplary process of FIG. 5 may be performed by automated multimedia call center agent 130. In another embodiment, some or all of the exemplary process described below may be performed by another device, such as live call center agent device 120, or a combination of devices.

The exemplary process may begin with automated multimedia call center agent 130 receiving a verbal request from a user (block 510). In one embodiment, a user (e.g., via a user device 110) may establish a session (e.g., a video session) with automated multimedia call center agent 130. Once established, the user may verbally provide a request for information to automated multimedia call center agent 130. Assume, for explanatory purposes, that the user provides the following verbal request—"I have a computer issue."

Automated multimedia call center agent 130 (e.g., via speech recognition component 310) may perform speech recognition on the verbal request to identify what the user has said. If automated multimedia call center agent 130 is unable to identify what the user has said or if additional information is needed to narrow the request, automated multimedia call center agent 130 may interact with the user to identify the request (block 520). For example, if automated multimedia call center agent 130 is unable to identify what the user has said, automated multimedia call center agent 130 may provide a graphical user interface to the user that includes a list of possible recognition results. In one embodiment, the list of possible recognition results may include a predetermined number of top-ranking recognition results. The user may then select the recognition result that corresponds to the verbal request.

If the request is too broad for automated multimedia call center agent 130 to identify multimedia content to provide to the user, automated multimedia call center agent 130 may audibly and/or visually request additional information from the user. In the example above, automated multimedia call center agent 130 may determine that "computer issue" is too broad, and may request additional information from the user to obtain a more narrowed request. Assume that the user narrows the request to "how do I connect a Samsung printer to my Dell computer that runs Windows 98." Additionally or alternatively, the user may provide additional information in non-verbal ways. For example, the user may provide one or more images, videos, data files, and/or links to automated multimedia call center agent 130 to help automated multimedia call center agent to narrow the request. In the example above, the user may, for example, provide an image of the printer (or a link to a Samsung web site that provides information regarding the printer) and/or an image of the computer (or a link to a Dell web site that provides information regarding the computer) to automated multimedia call center agent 130. In the case of an image or video, automated multimedia call center agent 130 may analyze the image/video to obtain additional information relating to the request. In the case of a data file, automated multimedia call center agent 130 may parse the data file to obtain additional information relating to the request. In the case of a link, automated multimedia call center agent 130 may retrieve a web page using the link and may parse the web page to obtain additional information relating to the request.

Automated multimedia call center agent 130 may obtain multimedia content for the request (block 530). For example, automated multimedia call center agent 130 (e.g., via multimedia retrieval component 320) may perform a search of a database, such as database 400, using word(s) from the request (and/or words provided to narrow the request) to identify multimedia content to be provided to the user. Automated multimedia call center agent 130 may, for example, obtain the multimedia content from a database, such as database 450. In the example above, the multimedia content may include video/audio showing a person connecting a Samsung printer to a Dell computer that runs Windows 98 and explaining the steps involved. Other multimedia content (or links to other multimedia content) may also be provided, such as a documentation manual for Samsung printers.

Automated multimedia call center agent 130 may provide the obtained multimedia content to the user (block 540). For example, automated multimedia call center agent 130 may cause the video/audio to be rendered on user device 110.

Automated multimedia call center agent 130 may determine whether the request has been satisfied (block 550). For example, automated multimedia call center agent 130 may audibly and/or visually ask the user whether the multimedia content satisfied the user's request.

If automated multimedia call center agent 130 determines that the request has been satisfied (block 550—YES), processing may end (e.g., processing may return to block 510 with automated multimedia call center agent 130 receiving another request from the user or another user). If, on the other hand, automated multimedia call center agent 130 determines that the request has not been satisfied (block 550—NO), automated multimedia call center agent 130 may transfer the session to live call center agent device 120 (block 560). In an exemplary embodiment, the automated call center agent transfers all relevant information about the user request that it has gathered, for example, user name, user account number, user callback information, and transfers this data to the live call center agent along with the communication session. In this way, the live call center agent associated with live call center agent device 120 may interact with the user to satisfy the request. In one embodiment, the interaction may involve the user providing multimedia content to live call center agent device 120. For example, the user may capture live video of the user attempting to connect the printer to the computer and provide the live video to the live call center agent associated with live call center agent device 120. Additionally or alternatively, the live call center agent may capture live video of the call center agent connecting a printer to a computer and provide the live video to the user associated with user device 110. In some embodiments, automated multimedia call center agent 130 may obtain and provide additional multimedia content to the user prior to transferring the user to the live call center agent.

Figure 6:
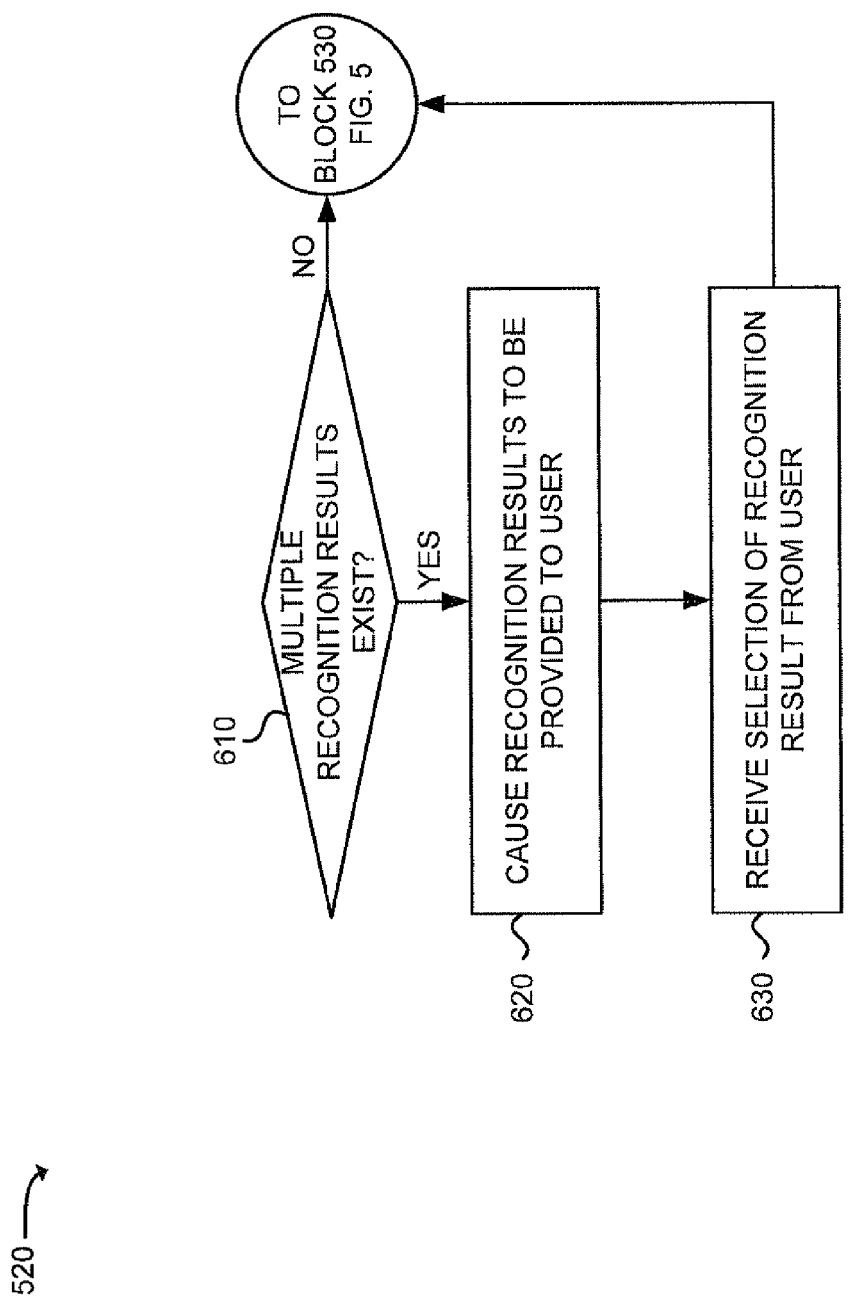

FIG. 6 is a flow chart of an exemplary process that may be associated with block 520 of FIG. 5. In one embodiment, the exemplary process of FIG. 6 may be performed by automated multimedia call center agent 130 (e.g., via speech recognition component 310). In another embodiment, some or all of the exemplary process described below may be performed by another device, such as live call center agent device 120, or a combination of devices.

The exemplary process may begin with automated multimedia call center agent 130 determining whether multiple recognition results exist for a verbal input received from the user (block 610). For example, automated multimedia call center agent 130 (e.g., via speech recognition component 310) may determine whether multiple recognition results exist when a highest ranking recognition result does not exceed a threshold. In this case, disambiguation of the verbal input is needed to correctly identify the user request.

If automated multimedia call center agent 130 determines that multiple recognition results do not exist for a verbal input (block 610—NO), processing may return to block 530 in FIG. 5, with automated multimedia call center agent 130 obtaining multimedia content for the request. If, on the other hand, automated multimedia call center agent 130 determines that multiple recognition results exist for the verbal input (block 610—YES), automated multimedia call center agent 130 may cause a list of recognition results to be provided to the user (block 620). The list of recognition results may include a number of highest-ranking recognition results obtained for the verbal input. In one embodiment, automated multimedia call center agent 130 may cause the list of recognition results to be visually rendered to the user.

Automated multimedia call center agent 130 may receive selection of a recognition result from the user (block 630). For example, the user may select one of the recognition results verbally or via another type of input (e.g., the user may select a number or letter corresponding to the desired recognition result). Processing may then return to block 530 in FIG. 5, with automated multimedia call center agent 130 obtaining multimedia content for the request.

The following example 700 of FIGS. 7A-7F illustrates the process described above with respect to FIGS. 5 and 6. Assume, for example 700, that an automated multimedia call center agent 130 provides information relating to automobiles. Assume further that a user establishes a video session with automated multimedia call center agent 130 to obtain instructions for changing the oil in his 2004 Sonata.

Automated multimedia call center agent 130 may audibly and/or visually ask the user as to what type of information the user requests (block 705), as illustrated in FIG. 7A. In response, assume that the user provides the verbal input— "change my oil" (block 710). Automated multimedia call center agent 130 may perform speech recognition on the verbal input to identify the request. Assume that automated multimedia call center agent 130 determines that the user has not provided enough information for identifying multimedia content for the request. Thus, automated multimedia call center agent 130 may request (audibly and/or visually) additional information relating to the vehicle for which the user desires to change the oil (block 715). Assume that the user provides the following verbal input—"2004 Sonata" (block 720).

Figure 7B:
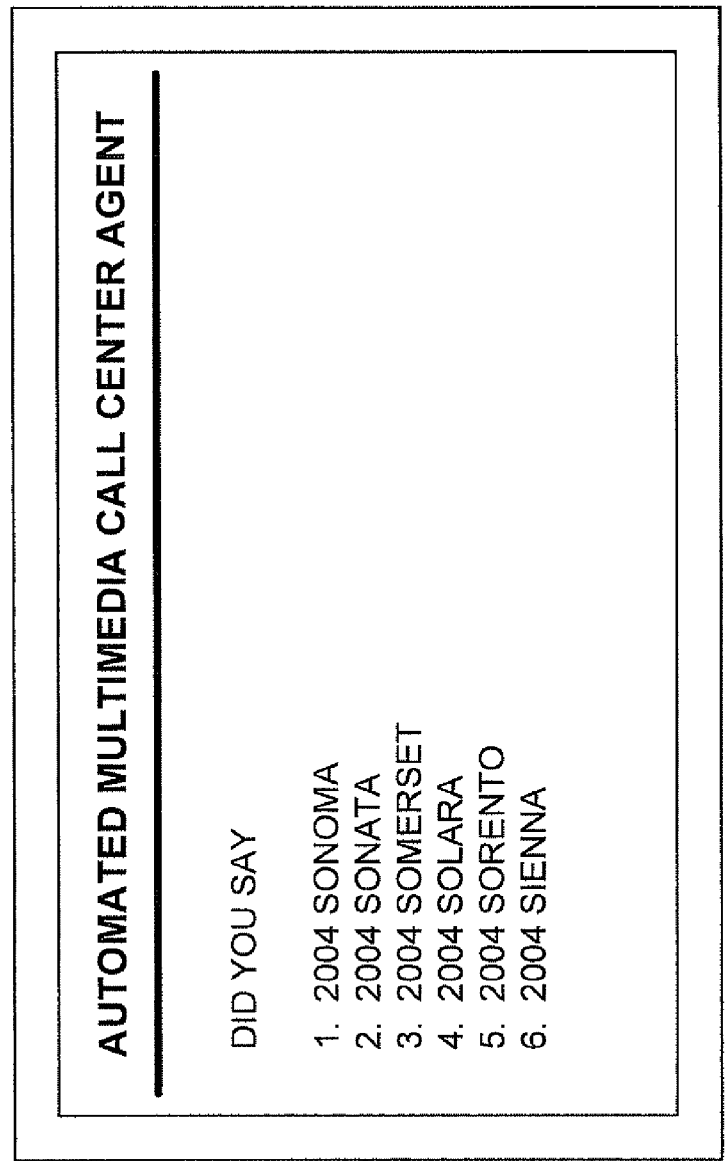
Figure 7C:
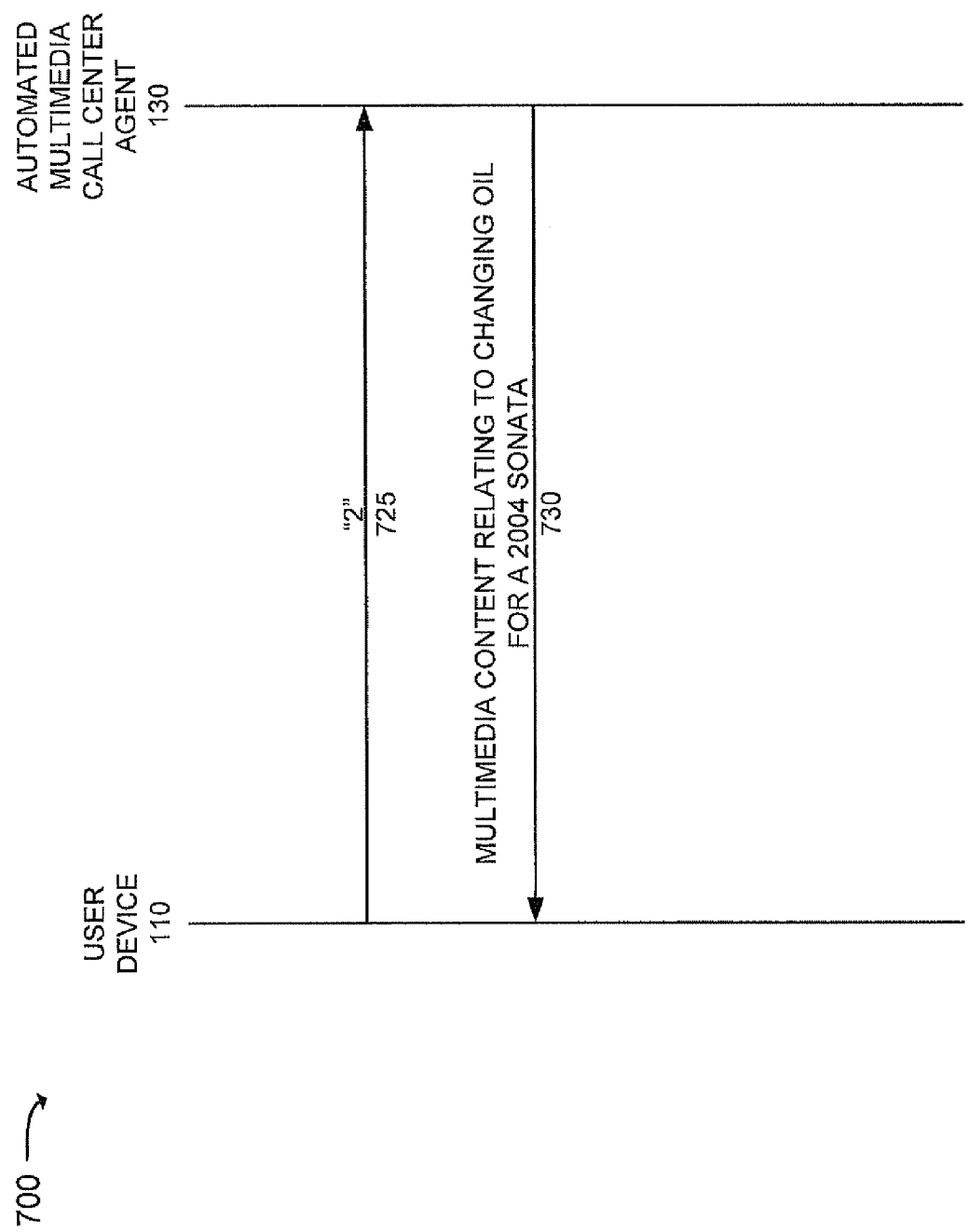

Automated multimedia call center agent 130 may perform speech recognition on the verbal input. Assume, for example 700, that when performing the speech recognition operation, automated multimedia call center agent 130 determines that multiple recognition results exist for the verbal input. Thus, automated multimedia call center agent 130 may cause a list of the most likely recognition results to be visually rendered to the user's user device 110, as illustrated in FIG. 7B. Assume that the user verbally selects recognition result number 2 (block 725), as illustrated in FIG. 7C. Automated multimedia call center agent 130 may use the verbal inputs from the user (e.g., changing oil and 2004 Sonata) to obtain multimedia content relating to the verbal inputs (e.g., multimedia content relating to changing oil in a 2004 Sonata). In one embodiment, automated multimedia call center agent 130 may identify the appropriate multimedia content from a database, such as database 400. Assume that automated multimedia call center agent 130 obtains video and audio instructions for changing oil in a 2004 Sonata.

Figure 7D:
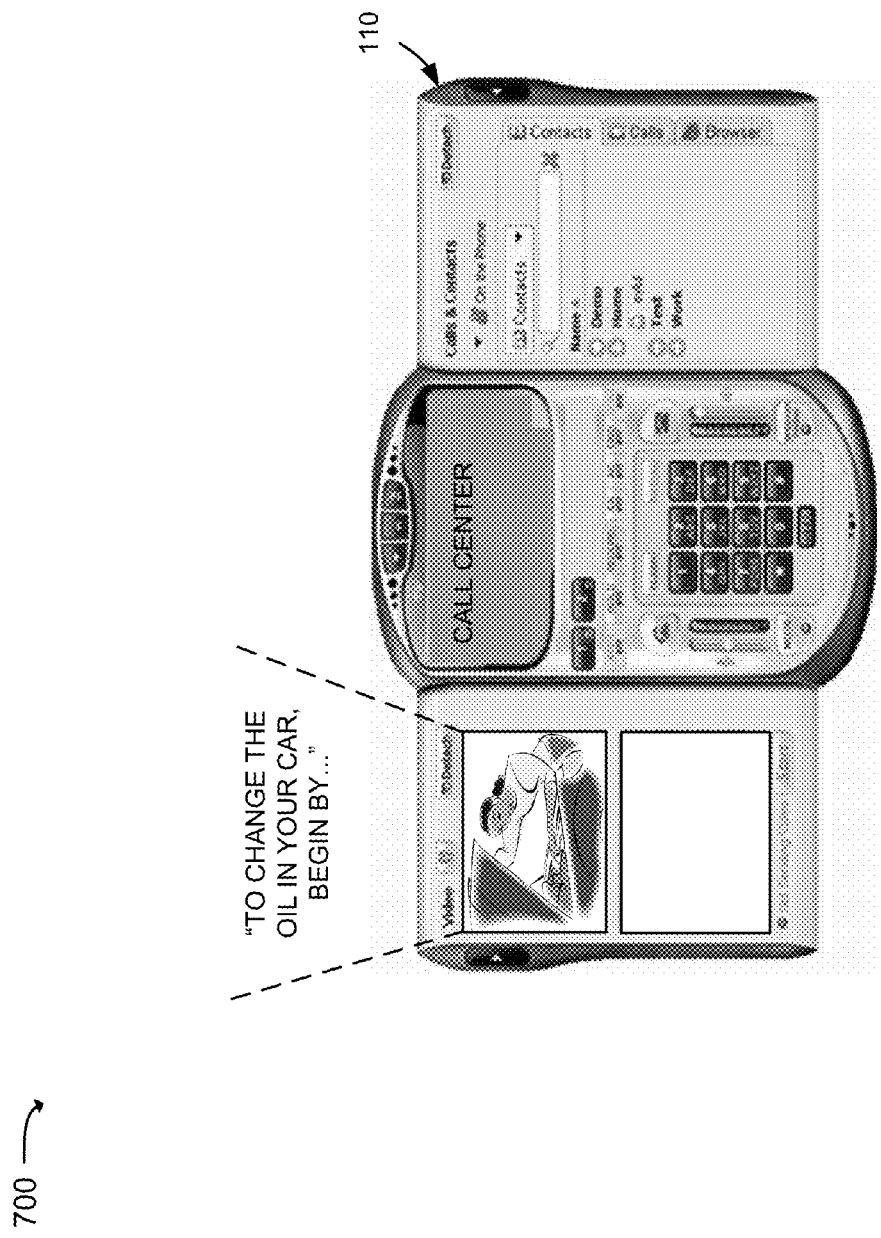
Figure 7F:
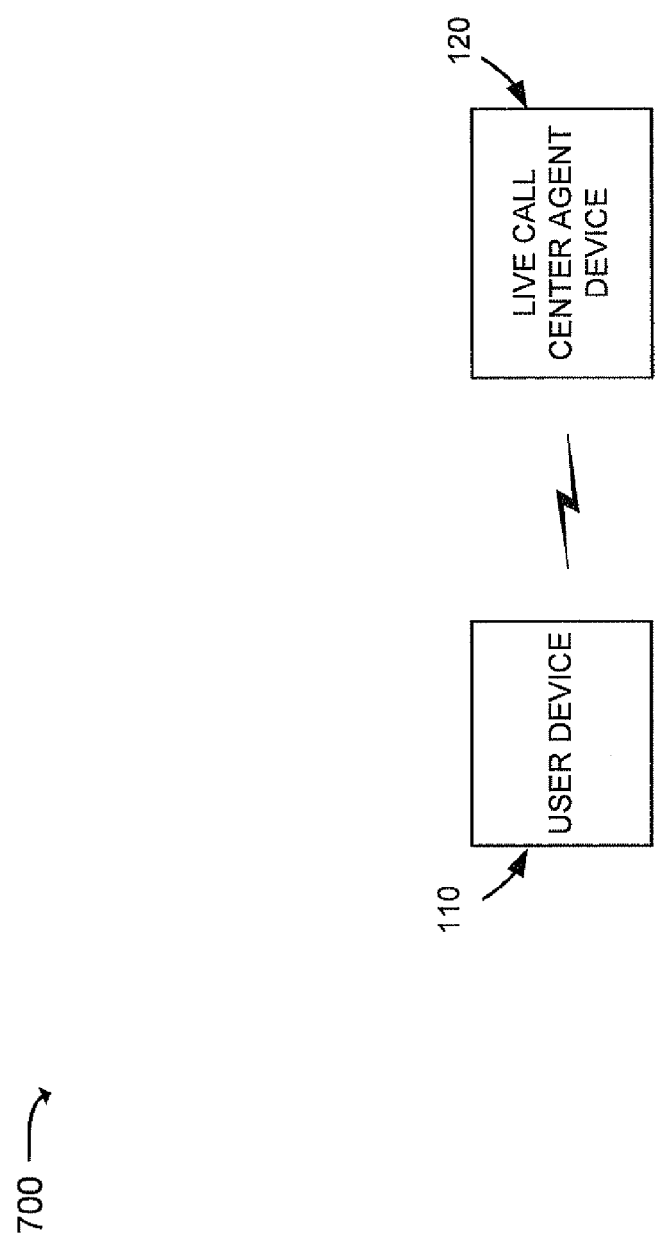

Automated multimedia call center agent 130 may provide the obtained multimedia content (block 730). As illustrated in FIG. 7D, the video/audio instructions for changing the oil in a 2004 Sonata may be rendered to the user by user device 110. Once the multimedia content has been provided, automated multimedia call center agent 130 may audibly and/or visually ask the user if additional information is needed (block 735), as illustrated in FIG. 7E. If the multimedia content did not answer the user's questions regarding changing the oil of his automobile, the user may request to be connected to a live agent (block 740). In response to the request, automated multimedia call center agent 130 may transfer the video session between user device 110 and automated multimedia call center agent 130 to live call center agent device 120, as illustrated in FIG. 7F. In an exemplary embodiment, the automated call center agent transfers all relevant information about the user request that it has gathered, for example, user vehicle information, an indicator that oil change content was rendered to user during the session, etc., and transfers this data to the live call center agent along with the communication session. The user may then interact with the live call center agent to answer any remaining questions regarding changing the oil. In some embodiments, the interaction may include the user providing multimedia content (e.g., an image or video (e.g., live video) of the user performing the steps involved with changing the oil) to the live call center agent and/or the live call center agent providing multimedia content to the user.

Figure 8:
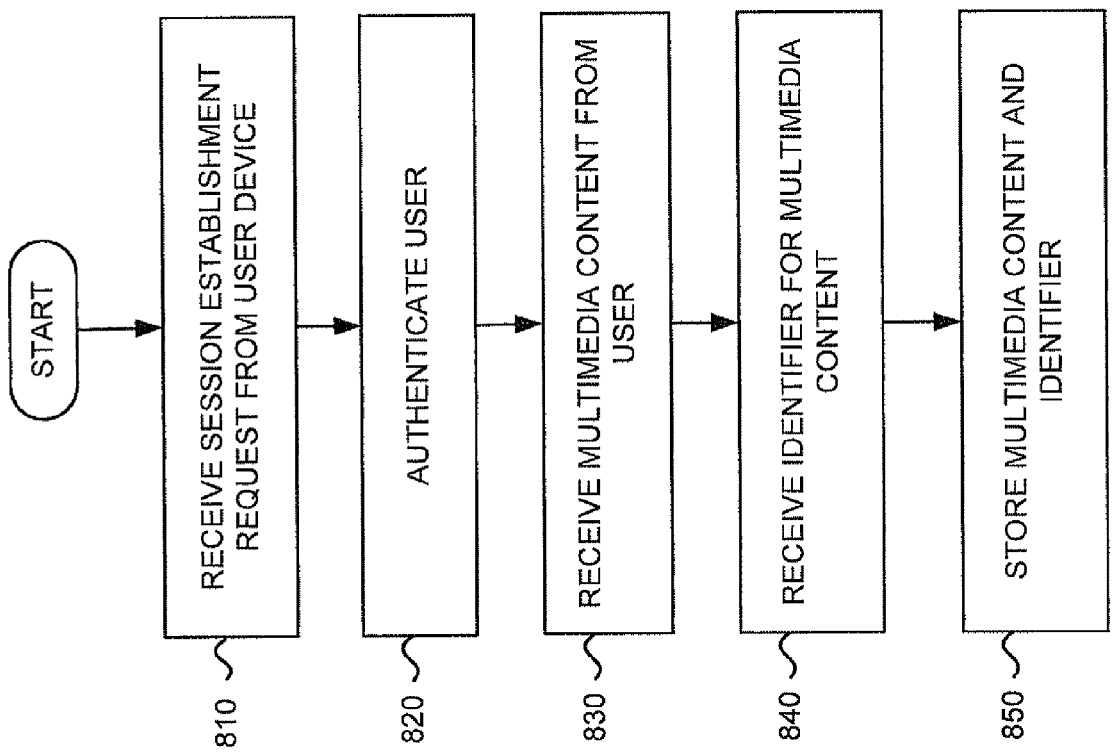
FIG. 8 is a flow chart of an exemplary process for storing multimedia content according to an exemplary embodiment.

FIG. 8 is a flow chart of another exemplary process for storing multimedia content consistent with exemplary embodiments. In one embodiment, the exemplary process of FIG. 8 may be performed by automated multimedia call center agent 130. In another embodiment, some or all of the exemplary process described below may be performed by another device or combination of devices.

Processing may begin with automated multimedia call center agent 130 receiving a session establishment request from a user (e.g., a user associated with user device 110) (block 810). The user may provide the session establishment request by, for example, attempting to connect to automated multimedia call center agent 130 in a known manner.

In one embodiment, automated multimedia call center agent 130 may authenticate the user (block 820). For example, automated multimedia call center agent 130 may request that the user provide a user identifier and/or password. Automated multimedia call center agent 130 may match the user identifier and password to a list of registered identifier/password combinations. If the user identifier and password match a registered identifier/password in the list, automated multimedia call center agent 130 may determine that the user is properly authenticated. If the user identifier and password do not match a registered identifier/password in the list, automated multimedia call center agent 130 may determine that the user is not properly authenticated.

Automated multimedia call center agent 130 may receive multimedia content from the user (block 830). In one embodiment, automated multimedia call center agent 130 may allow the user to push multimedia content to automated multimedia call center agent 130 when the user has been properly authenticated. The multimedia content may include audio content, video content, images, data files, and/or other types of content. The multimedia content may further include links to audio content, video content, images, data files, and/or other types of content.

Automated multimedia call center agent 130 may obtain an identifier for the multimedia content (block 840). For example, automated multimedia call center agent 130 may obtain the identifier from the user of user device 110 or may generate the identifier automatically. Automated multimedia call center agent 130 may store the multimedia content and identifier (block 850). For example, automated multimedia call center agent 130 may store the multimedia content and identifier in a database, such as database 450. Once stored, the multimedia content may be obtained by the user or other users in the manner described above with respect to FIG. 5.

Figure 9A:
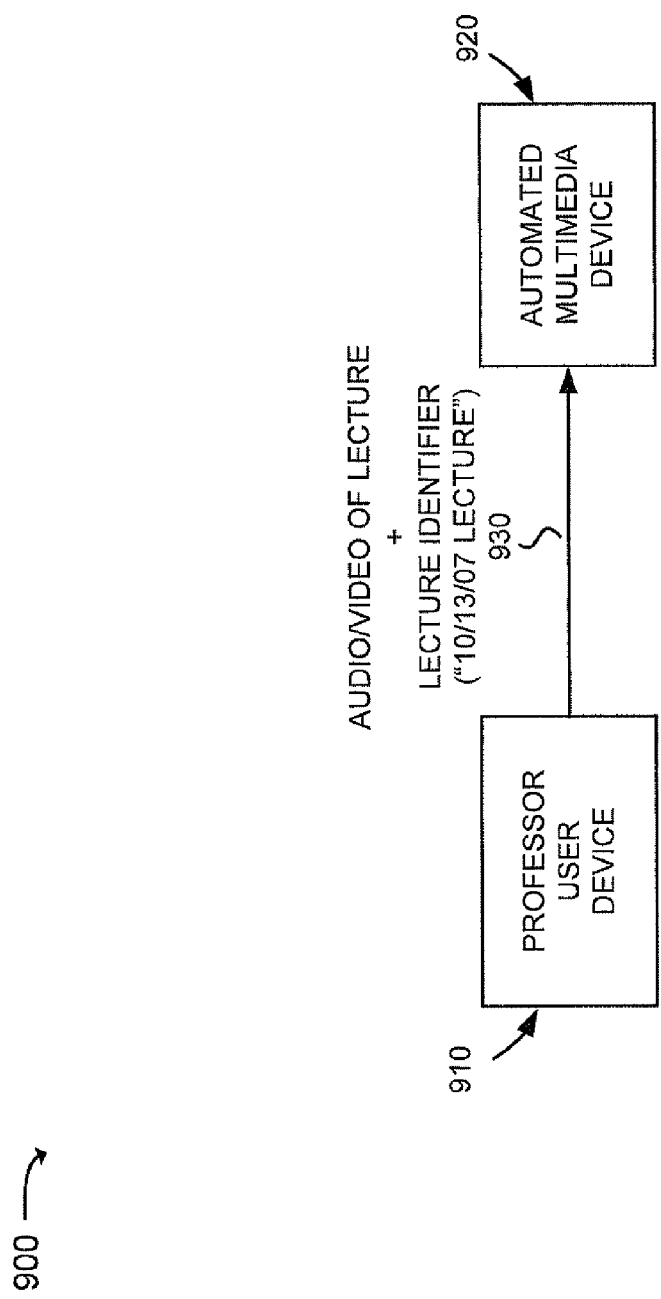
FIGS. 9A-9C illustrate an example of the exemplary processes of FIGS. 5 and 8.
Figure 9B:
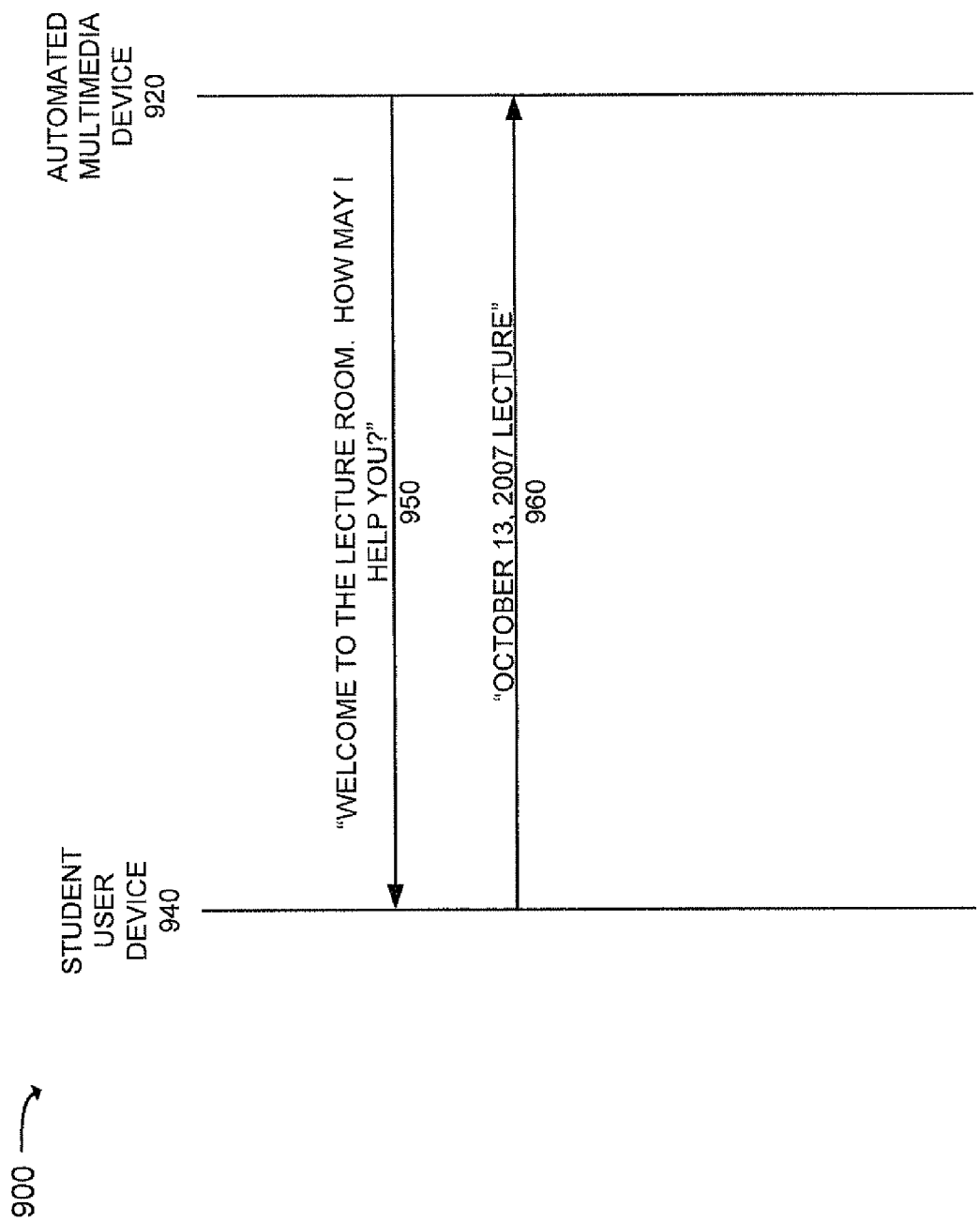
Figure 9C:
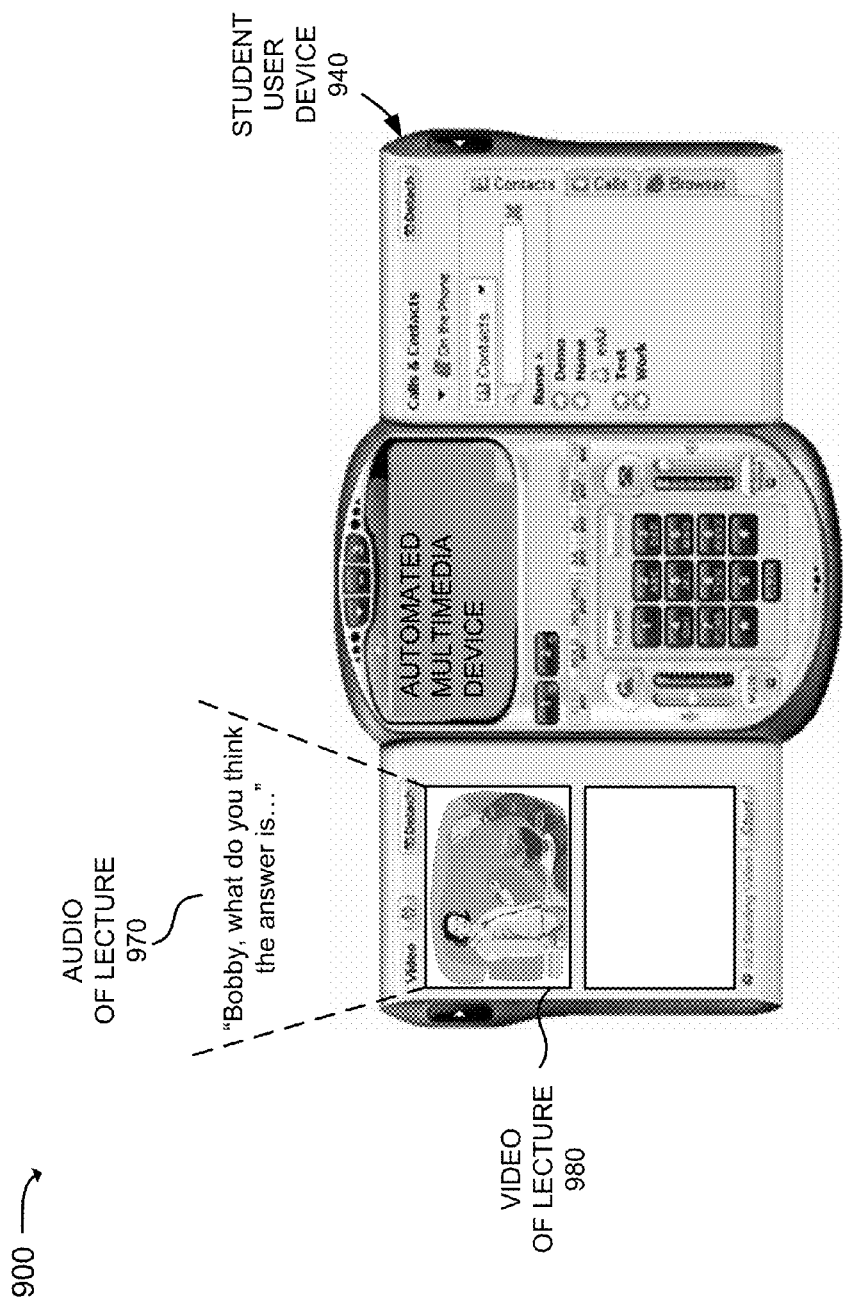

The following example 900 of FIGS. 9A-9C illustrates the processes described above with respect to FIGS. 5 and 8. Assume, for example 900, that a professor wishes to make her lectures available to her students on-line. Accordingly, the professor may, via a user device (referred to in this example as a "professor user device 910"), establish a session with an automated multimedia call center agent (referred to in this example as an "automated multimedia device 920"), as illustrated in FIG. 9A. The professor may provide information 930 to automated multimedia device 920. Information 930 may include the professor's multimedia content (e.g., in this example, assume the multimedia content includes audio/video of a lecture) and a name for the multimedia content (e.g., in this example, assume the name is "10/13/07 Lecture"). Automated multimedia device 920 may store received information 930.

Assume, at some later point in time, a student desires to access the multimedia content. The student may, via a user device (referred to in this example as a "student user device 940"), establish a session with automated multimedia device 920. Automated multimedia device 920 may audibly and/or visually ask the student as to what type of information the student requests (block 950), as illustrated in FIG. 9B. In response, assume that the student provides the verbal input—"Oct. 13, 2007 lecture" (block 960). Automated multimedia device 920 may perform speech recognition on the verbal input to identify the request. Assume that automated multimedia device 920 correctly identifies the student's request, obtains the corresponding multimedia content (i.e., the 10/13/07 Lecture audio/video file that the professor uploaded to automated multimedia device 920), and provides the multimedia content to student user device 940.

Student user device 940 may render audio/video content 970/980, as illustrated in FIG. 9C. In this way, the student may obtain multimedia content that has been uploaded by his professor. Similarly, the student could then upload content for the professor, for example, answers to professor questions posed in the lecture.

Embodiments described herein provide an automated multimedia call center agent that allows users to obtain multimedia content relating to topics of interest.

The foregoing description of exemplary embodiments provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 5, 6, and 8, the order of the blocks may be varied in other embodiments. Moreover, non-dependent blocks may be implemented in parallel.

The exemplary embodiments, as described above, may be implemented in many different forms of software, firmware, and hardware in the implementations illustrated in the figures. The actual software code or specialized control hardware used to implement the exemplary embodiments described herein is not limiting of the invention. Thus, the operation and behavior of the exemplary embodiments were described without reference to the specific software code—it being understood that one would be able to design software and control hardware to implement the exemplary embodiments based on the description herein.

Further, certain portions of the invention may be implemented as "logic" that performs one or more functions. This logic may include hardware, such as an application specific integrated circuit, a field programmable gate array, a processor, or a microprocessor, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
a memory to store instructions; and
a processor to execute the instructions to:
receive, from a user device, a request via a multimedia session between the device and the user device that differs from the device,
process the request to obtain first information associated with the request,
determine that the first information is insufficient to identify a multimedia content item,
request second information to narrow the request based on determining that the first information is insufficient to identify the multimedia content item,
receive the second information from the user device,
the second information including one or more of an image, a video, or a data file,
a type of the second information being different from a type of the first information, and
the second information being different from the multimedia content item,
identify multiple recognition results after receiving the first information and the second information,
provide, to the user device, information regarding the multiple recognition results,
receive, from the user device, a selection of a particular recognition result of the multiple recognition results,
identify the multimedia content item based on the selection of the particular recognition result, and
provide, via the multimedia session, the multimedia content item to the user device.

2. The device of claim 1,
where the request is a first request, and
where the processor is further to:
receive, from the user device, a second request for additional information associated with the first request,
determine that the additional information is not available, and
modify, based on determining that the additional information is not available, the multimedia session to enable the user device to communicate with an agent.

3. The device of claim 1, where the multimedia content item includes at least one of:
audio instructions,
video instructions,
a frequently asked questions document,
an operating manual, or
content retrieved from a remote device.

4. The device of claim 1,
where the request includes a verbal input, and
where, when processing the request, the processor is to:
perform speech recognition on the verbal input to obtain the first information.

5. The device of claim 1,
where the second information includes the image, and
where, when identifying the multiple recognition results, the processor is further to:
analyze the image to obtain additional information, and
identify the multiple recognition results based on the first information and the additional information.

6. The device of claim 1,
where the second information includes the video, and where, when identifying the multiple recognition results, the processor is to:
analyze the video to obtain additional information, and
identify the multiple recognition results based on the first information and the additional information.

7. The device of claim 1,
where the second information includes the data file, and
where, when identifying the multiple recognition results, the processor is to:
parse the data file to obtain additional information, and
identify the multiple recognition results based on the first information and the additional information.

8. The device of claim 1,
where the second information further includes a link to a web page, and
where, when identifying the multiple recognition results, the processor is to:
obtain information associated with the web page,
parse the information associated with the web page to obtain additional information, and
identify the multiple recognition results based on the first information and the additional information.

9. The device of claim 1, where the processor, when identifying the multiple recognition results, is further to:
identify, based on the first information and the second information, a plurality of recognition results,
rank the plurality of recognition results based on respective relevance to the request, and
identify at least two highest ranked recognition results, of the ranked plurality of recognition results, as the multiple recognition results.

10. A method comprising:
receiving, by a processor and from a user device, a request, the request being received during a multimedia session between a device associated with the processor and the user device;
identifying, by the processor and based on the received request, first information;
determining, by the processor, that the first information is insufficient to identify a multimedia content item;
requesting, by the processor and based on determining that the first information is insufficient to identify the multimedia content item, second information, to narrow the request, from the user device;
receiving, from the user device and via the multimedia session, the second information,
the second information including one or more of an image, a video, or a data file,
a type of the second information being different from a type of the first information, and
the second information being different from the multimedia content item;
identifying, by the processor and based on the first information and the second information, the multimedia content item from two or more multimedia content items; and
providing, by the processor, the multimedia content item to the user device.

11. The method of claim 10,
where the request is a first request, and
where the method further comprises:
receiving, from the user device, a second request to transfer the multimedia session to a live agent, and
modifying, based on receiving the second request, the multimedia session to connect the user device with a call center device associated with the live agent to create a transferred multimedia session.

12. The method of claim 11, where receiving the second information includes:
enabling the call center device to receive the second information during the transferred multimedia session; and
receiving the second information from the call center device.

13. The method of claim 10, where the first information includes a verbal input.

14. The method of claim 10,
where the user device is a first user device, and
where providing the multimedia content item includes:
identifying, from a plurality of user devices, a second user device that is associated with the multimedia content item;
acquiring the multimedia content item from the second user device; and
providing the multimedia content item to the first user device.

15. The method of claim 14, where identifying the second user device includes:
identifying a topic associated with the multimedia content item; and
selecting, based on the topic, the second user device from the plurality of user devices.

16. The method of claim 10, where identifying the multimedia content item includes:
identifying a plurality of recognition results based on the first information and the second information,
the plurality of recognition results corresponding to the two or more multimedia content items;
ranking the plurality of recognition results based on respective relevance to the request;
selecting at least two recognition results of the ranked plurality of recognition results;
providing, to the user device, information associated with the at least two recognition results;
receiving, from the user device, a selection of a recognition result from the at least two recognition results; and
identifying the multimedia content item based on the selection of the recognition result.

17. A device comprising:
a memory to store instructions; and
a processor to execute the instructions to:
receive, from a user device, a first request that includes first information,
the first request being received during a multimedia session between the device and the user device,
determine that the first information is insufficient to identify a multimedia content item,
request second information to narrow the request based on determining that the first information is insufficient to identify the multimedia content item,
receive the second information from the user device,
the second information including one or more of an image, a video, or a data file,
a type of the second information being different from a type of the first information, and
the second information being different from the multimedia content item,
identify the multimedia content item based on the first information and the second information,
cause the multimedia content item to be provided to the user device,
receive, from the user device and after providing the multimedia content item, a second request associated with communicating with a live agent,
send, to a call center device associated with the live agent and based on receiving the second request, information identifying the multimedia content item, and
transfer the multimedia session to the call center device associated with the live agent.

18. The device of claim 17, where the processor, when identifying the multimedia content item, is further to:
identify, based on the first information and the second information, a plurality of multimedia content items,
send, to the user device, information relating to the plurality of multimedia content items, and
receive, from the user device, a selection of the multimedia content item from the plurality of multimedia content items.

19. The device of claim 18, where the first information includes a verbal input.

20. The device of claim 17, where the multimedia content item includes at least one of:
audio instructions,
video instructions,
a frequently asked questions document,
an operating manual, or
content retrieved from a remote device.

21. A method comprising:
receiving, by a processor and from a user device, a first request that includes first information;
determining, by the processor, that the first information is insufficient to identify a multimedia content item from a plurality of multimedia content items;
providing, by the processor and based on determining that the first information is insufficient to identify the multimedia content item, a second request to the user device to obtain second information to narrow the first request;
receiving, by the processor and from the user device, the second information,
the second information including at least one of an image, a video, or a data file,
a type of the second information being different from a type of the first information, and
the second information being different from the multimedia content item;
identifying, by the processor, the multimedia content item based on the first information and the second information; and
providing, by the processor, the multimedia content item to the user device.

22. The method of claim 21, further comprising:
receiving, after providing the multimedia content item, a third request to communicate with a live agent; and
transferring a multimedia session to a call center device associated with the live agent based on receiving the third request.

23. The method of claim 21,
where the user device is a first user device, and
where the method further comprises:
identifying a second user device, of a plurality of user devices, that is associated with the multimedia content item; and
acquiring, from the second user device, the multimedia content item before providing the multimedia content item.

* * * * *